(12) United States Patent
Horii et al.

(10) Patent No.: US 7,401,670 B2
(45) Date of Patent: Jul. 22, 2008

(54) DRAINAGE STRUCTURE IN FUEL CELL ELECTRIC VEHICLE

(75) Inventors: Yoshiyuki Horii, Saitama (JP); Junya Watanabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/199,154

(22) Filed: Aug. 9, 2005

(65) Prior Publication Data

US 2006/0040160 A1 Feb. 23, 2006

(30) Foreign Application Priority Data

Aug. 19, 2004 (JP) .............................. 2004-239695

(51) Int. Cl.
*B60K 1/00* (2006.01)
(52) U.S. Cl. ...................... 180/65.1; 180/220
(58) Field of Classification Search ................ 180/69.1, 180/219, 218, 65.3, 220, 65.1, 68.5; 123/41.31, 123/41.5, DIG. 12, 3; 429/21, 12, 38, 20, 429/13; 60/286, 300
See application file for complete search history.

(56) References Cited

U.S. PATENT DOCUMENTS

| | | | | |
|---|---|---|---|---|
| 4,069,371 A | * | 1/1978 | Zito | .............................. 429/21 |
| 5,653,106 A | * | 8/1997 | Katashiba et al. | .............. 60/300 |
| 6,122,909 A | * | 9/2000 | Murphy et al. | ................. 60/286 |
| 6,158,543 A | * | 12/2000 | Matsuto et al. | ............. 180/220 |
| 6,230,669 B1 | * | 5/2001 | Evans | ........................ 123/41.5 |
| 6,238,814 B1 | * | 5/2001 | Horiguchi et al. | .............. 429/12 |
| 6,427,639 B1 | * | 8/2002 | Andrews et al. | ................ 123/3 |
| 6,679,345 B2 | * | 1/2004 | Hirayama et al. | ........... 180/65.3 |
| 6,698,389 B2 | * | 3/2004 | Andrews et al. | .......... 123/41.31 |
| 6,722,460 B2 | * | 4/2004 | Yang et al. | .................... 180/220 |
| 6,815,104 B2 | * | 11/2004 | Uehara et al. | .................. 429/13 |
| 6,896,985 B2 | * | 5/2005 | Horiguchi et al. | .............. 429/22 |
| 7,234,551 B2 | * | 6/2007 | Horii | .......................... 180/65.1 |
| 2002/0005305 A1 | * | 1/2002 | Hirayama et al. | ........... 180/68.5 |
| 2002/0162693 A1 | * | 11/2002 | Mizuno et al. | .............. 180/65.1 |
| 2003/0068543 A1 | | 4/2003 | Yasuo et al. | |
| 2003/0155160 A1 | | 8/2003 | Nomura et al. | |
| 2004/0043266 A1 | | 3/2004 | Oma et al. | |

FOREIGN PATENT DOCUMENTS

| | | | |
|---|---|---|---|
| JP | 3-41231 A | | 2/1991 |
| JP | 04123989 A | * | 4/1992 |
| JP | 11-13908 A | | 1/1999 |
| JP | 2001-313056 A | | 11/2001 |
| JP | 2004-139817 A | | 5/2004 |
| WO | WO-2004/021494 A3 | | 3/2004 |

* cited by examiner

*Primary Examiner*—Hau V Phan
(74) *Attorney, Agent, or Firm*—Birch, Stewart, Kolasch & Birch, LLP

(57) ABSTRACT

To provide a drainage structure for a fuel cell electric vehicle wherein gas exhausted from a fuel cell is exhausted into the air via a muffler and generated water from the fuel cell can be moderately exhausted. In a drainage structure is provided for a fuel cell electric vehicle that includes a fuel cell for generating electric power by reacting hydrogen and oxygen, a hydrogen cylinder for supplying gaseous hydrogen to the fuel cell, a dilution box for storing gas exhausted from the fuel cell and generated water, a drainage pipe for directing water to the dilution box and a scupper provided on the drainage pipe and open toward the side of the body. A control valve that is opened or closed at predetermined times is arranged in connection with the drainage pipe.

20 Claims, 10 Drawing Sheets

DRAINAGE STRUCTURE IN FUEL CELL ELECTRIC VEHICLE

BACKGROUND OF THE INVENTION

CROSS-REFERENCE TO RELATED APPLICATIONS

The present non-provisional application claims priority under 35 USC 119 to Japanese Patent Application No. 2004-239695 filed on Aug. 19, 2004 the entire contents thereof is hereby incorporated by reference.

TECHNICAL FIELD OF THE INVENTION

The present invention relates to a drainage structure for exhausting generated water from a fuel cell in a fuel cell electric vehicle.

DESCRIPTION OF BACKGROUND ART

Heretofore, a fuel cell electric vehicle is known for driving a motor and thereby driving the vehicle based upon electric power supplied from a fuel cell in which water that is generated is exhausted toward the side of the body so that the generated water from the fuel cell is hardly splashed on a driving wheel. See, for example, JP-A No. 313056/2001. In this vehicle, the generated water is stored in a water tank and water of an amount which overflows from the water tank is exhausted outside the body together with exhaust gas.

In the above-mentioned conventional type construction, often, when a stored amount in the water tank exceeds the capacity of the tank, drainage is performed. However, for controlled drainage, an improvement with regard to this point is desired.

Considering a case wherein gas that is supplied to a fuel cell is high-pressure gas to some extent, a structure for that gas to be emitted from the fuel cell and the water generated by the fuel cell are first stored in a storage box. The emission gas is exhausted into the air via a muffler after a dilution process is applied. It is desirable that only the generated water is individually exhausted.

SUMMARY AND OBJECTS OF THE INVENTION

An embodiment of the present invention provides a drainage structure in a fuel cell electric vehicle where emission gas from a fuel cell is exhausted into the air via a muffler and generated water from the fuel cell can be moderately exhausted.

According to an embodiment of the present invention, a drainage structure in a fuel cell electric vehicle is provided with a fuel cell 51 for generating electric power by reacting hydrogen and oxygen. A hydrogen cylinder 52 is provided for supplying gaseous hydrogen to the fuel cell. A storage box, for example, a dilution box 56 in the embodiment, is provided for storing gas emitted from the fuel cell and generated water. A drainage pipe 81 is provided for directing water from the storage box. A scupper 79 is provided in connection with the drainage pipe and opens towards the side of the body and includes a control valve 82 that is opened or closed at predetermined times that is arranged for the drainage pipe.

According to the configuration, an exhaust pipe provided with a muffler is directed out of the storage box separately from the drainage pipe. The exhaust gas in the storage box is emitted into the air using the exhaust pipe and only generated water in the storage box can be exhausted using the drainage pipe at a predetermined time, for example, every predetermined time.

In case the above-mentioned fuel cell electric vehicle is configured as a saddle-ride type vehicle such as a motorcycle, exhausted generated water is hardly splashed on a foot of an occupant because drainage is performed at the back of the normal position for the foot which is located in front of the position of a seat if the scupper is located at the back of the position of the seat of the vehicle.

In addition, in the case where a side stand 38 for supporting the body in a state that is inclined on one side is provided and the scupper is arranged on the side on which the side stand is provided, generated water in the drainage pipe is also easily exhausted from the scupper when the body is supported by the side stand in the inclined state while the vehicle is stopped.

According to an embodiment of the invention, gas emitted from the fuel cell can be exhausted into the air via the muffler and generated water from the fuel cell can be moderately exhausted.

According to an embodiment of the invention, exhausted generated water can be prevented from being splashed on a foot of an occupant.

According to the an embodiment of the invention, the drainability of the storage box when the vehicle is stopped can be enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
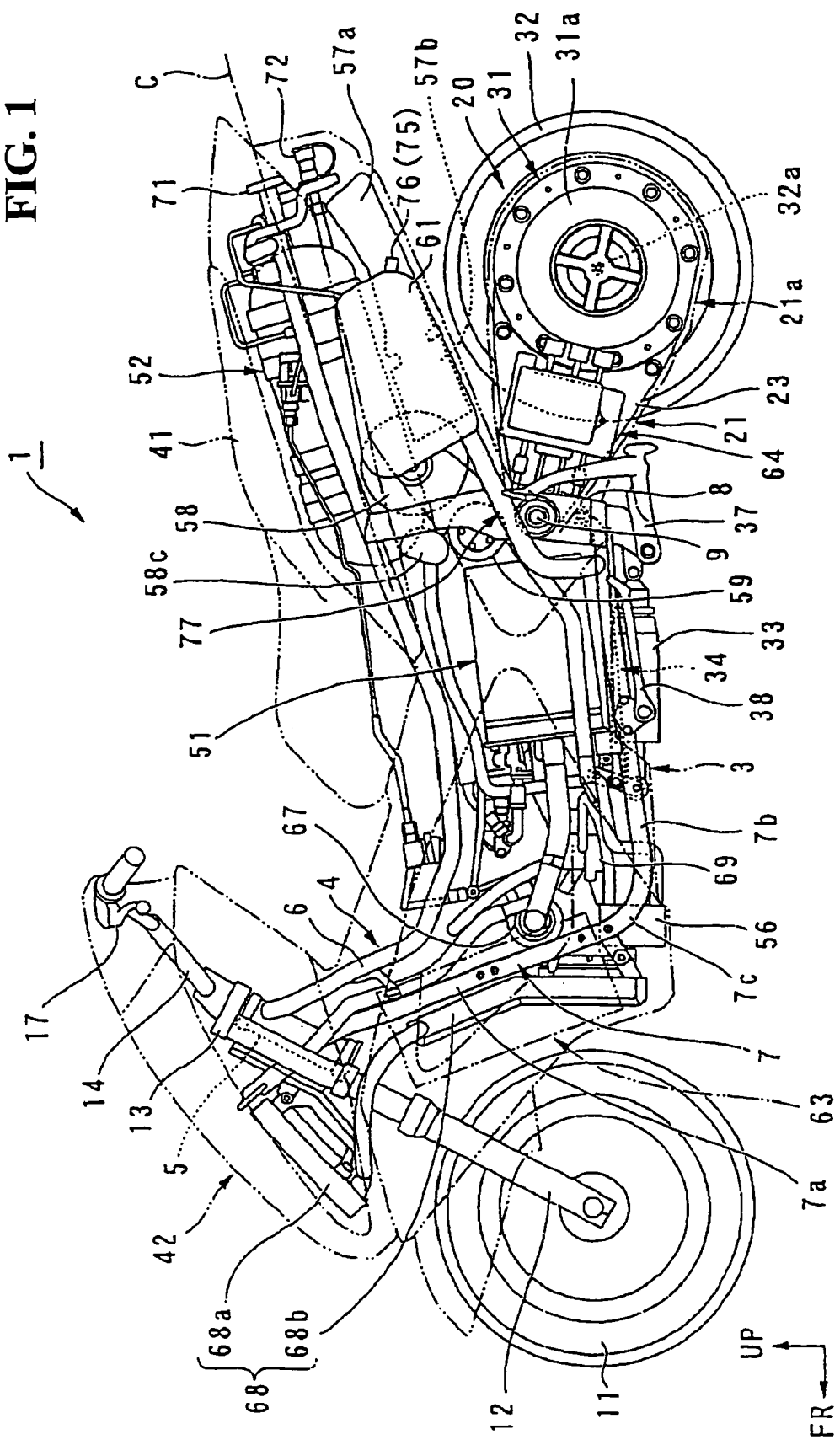
FIG. 1 is a left side view showing a fuel cell electric vehicle (a motorcycle) equivalent to an embodiment of the invention.

Referring to the drawings, an embodiment of the invention will be described below. A direction such as forward, rearward, rightward and leftward in the following description shall be the same as a direction in a vehicle unless special description is made. An arrow FR in the drawing indicates the front of the vehicle, an arrow LH indicates the left of the vehicle, and an arrow UP indicates the upside of the vehicle.

Figure 2:
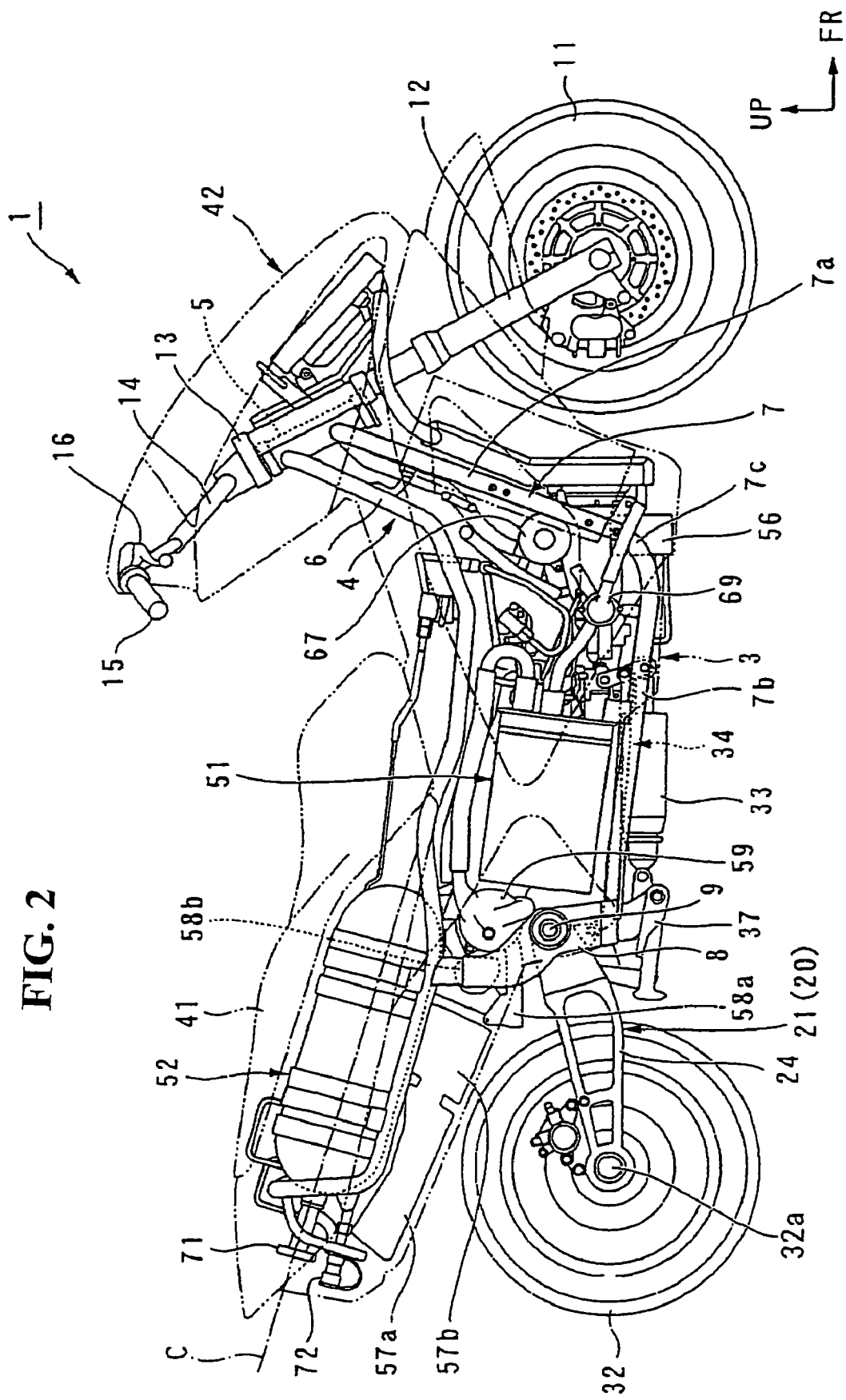
FIG. 2 is a right side view showing the fuel cell electric vehicle.
Figure 3:
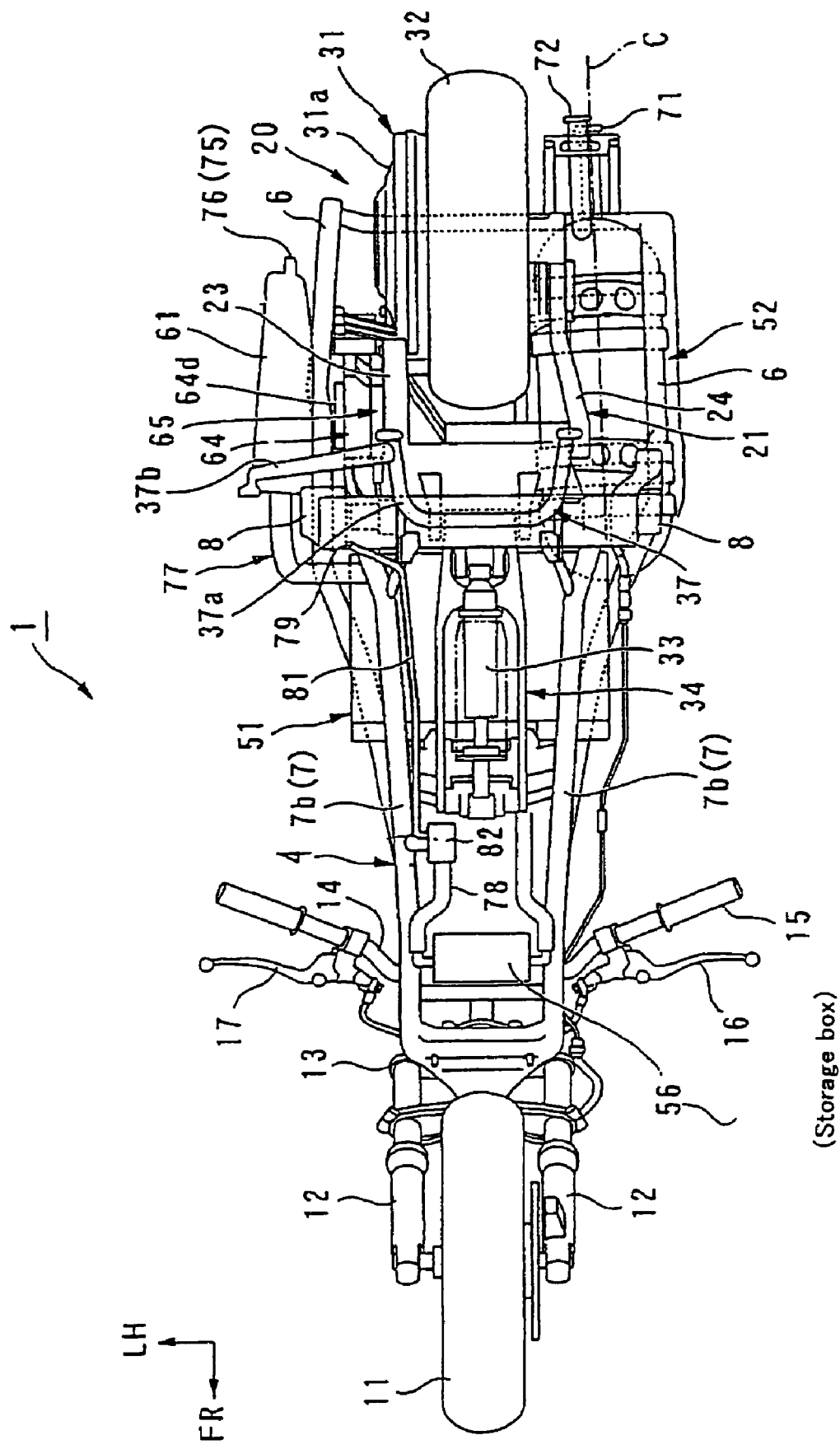
FIG. 3 is a bottom view showing the fuel cell electric vehicle.

A motorcycle 1 shown in FIGS. 1 to 3 is a fuel cell electric vehicle that is operated by driving a motor 31 for driving the vehicle 1 based upon electric power supplied from a fuel cell 51 that is mounted substantially in the center of the body. The motorcycle 1 is also a scooter-type vehicle provided with a low deck floor part (hereinafter merely called a floor part) 3 with a rectangular parallelepiped fuel cell 51 being arranged in the vicinity of the floor part 3. The motor 31 is a so-called wheel-in motor that is arranged inside a rear wheel 32 which is a driving wheel of the motorcycle 1. The motor 31 is provided with the body of the motor and a deceleration mechanism in a casing 31a, that is formed as an integrated unit, and is attached in the wheel from the left side for example in a state in which its output shaft is arranged coaxially with an axle 32a of the rear wheel.

A front wheel 11 of the motorcycle 1 is supported by the lower ends of a pair of right and left front forks 12 and the upside of each front fork 12 is supported by a head pipe 5 at the front end of a body frame 4 via a steering stem 13 so that the front fork can be steered. A handlebar 14 is attached on the upper end of the steering stem 13 with a throttle grip 15 being arranged on a right grip of the handlebar 14, and a rear brake lever 16 and a front brake lever 17 being arranged in front of the left and right grips.

A pivot plate 8 extends in a vertical direction of the body and is provided to the rear of the body frame 4. The front end of a rear swing arm 21 is supported via a pivot 9 by a slightly lower part of an intermediate part of the pivot plate 8 so that the side of the rear end can be vertically rocked. A left arm body 23 of the rear swing arm 21 extends up to the front end of the motor 31 and supports the casing 31a of the motor 31, while a right arm body 24 extends up to a center position of the rear wheel 32 and supports the axle 32a of the rear wheel. A motor unit 20 that is provided as a swing unit of the motorcycle 1 (in other words, as a rear frame for supporting the rear wheel 32 so that the rear wheel can be rocked) is formed mainly by the above-mentioned rear swing arm 21 and the motor 31.

A rear shock absorber 33 extends longitudinally and is arranged under the body frame 4 and under the fuel cell 51. The rear end of the rear shock absorber 33 is coupled to a lower part of the body frame 4 and the front end of the rear shock absorber 33 is coupled to a lower part of the motor unit 20 (the rear swing arm 21) via a link mechanism 34. The link mechanism 34 strokes the rear shock absorber 33 longitudinally according to the vertical rocking of the motor unit 20 so that shock and vibration input to the motor unit 20 are absorbed by the stroke of the rear shock absorber 33.

The body frame 4 is provided with an upper tube 6 branched toward the right and the left from an upper part of the head pipe 5, that extends diagonally rearwardly and downwardly and extends rearwardly after being bent in a height equivalent to a substantial middle in a vertical direction of the body. A down tube 7 is branched toward the right and the left from a lower part of the head pipe 5, and extends diagonally rearwardly and downwardly and extends rearwardly after being bent at the lower end of the body. The rear end of each upper tube 6 and the rear end of the down tube 7 are coupled to the upper end and the lower end of the pivot plate 8 located at the back of the fuel cell 51. Hereinafter, a part of the down tube 7 from the head pipe 5 that is a bent part 7c at the lower end of the body will be described as a front side 7a and a part from the bent part 7c to the pivot plate 8 will be described as a lower side 7b.

Each upper tube 6 extends further rearwardly from the pivot plate 8 towards the rear end of the body and a rear half of each upper tube 6 is used for a seat frame for supporting a seat for occupants 41. A front half of the seat 41 is partially used for a rider of the motorcycle 1 and a rear half is partially used for a rear passenger.

The body of the motorcycle 1 is covered with a body cover 42 mainly made of synthetic resin. The body cover 42 also functions as a windshield and a part forms the floor part 3 together with the body frame 4. A main stand 37 for supporting the body in an upright state is attached to the center of the lower part of the body frame 4 and a side stand 38 for supporting the body in a state in which the body is inclined to the left is attached to the left side of the lower part of the body frame 4.

Figure 4:
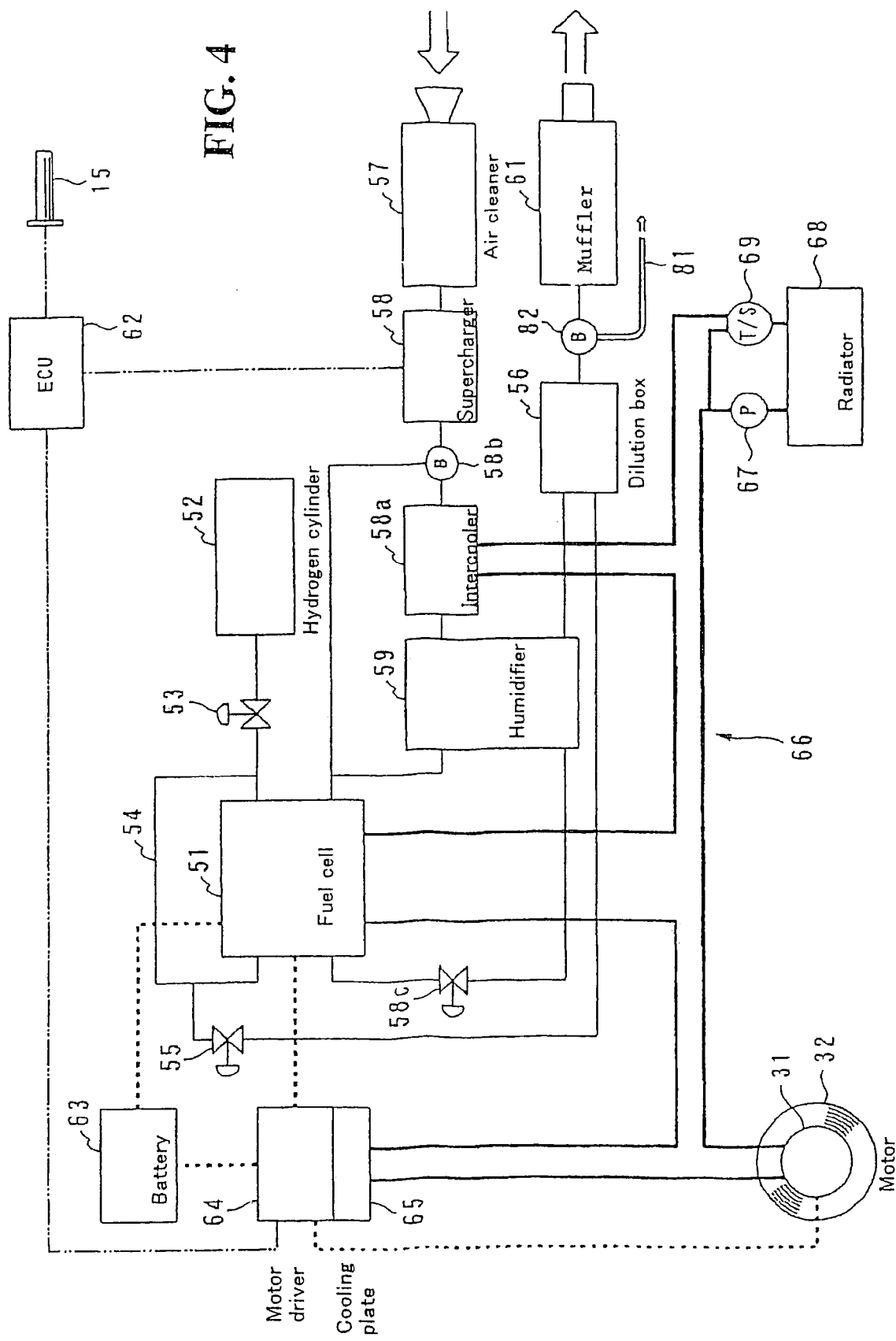
FIG. 4 is a block diagram showing a main part of a fuel cell system in the fuel cell electric vehicle.

Referring to FIG. 4, the outline of a fuel cell system of the motorcycle 1 will be described below.

The fuel cell 51 is a well-known polymer electrolyte fuel cell (PEMFC) acquired by laminating multiple battery modules (battery cells) for generating electric power by electrochemical reaction and for generating water by supplying gaseous hydrogen to the anode side as a fuel gas and supplying air including oxygen to the cathode side as an oxidizer gas.

Gaseous hydrogen as fuel gas is supplied from a hydrogen cylinder 52 to the fuel cell 51 via a cut-off valve 53 under a predetermined pressure (in other words, in a predetermined high-pressure state) and after the gaseous hydrogen is used for power generation, it is led into a hydrogen circulating passage 54. In the hydrogen circulating passage 54, unreacted gaseous hydrogen is repeatedly supplied to the fuel cell 51 together with fresh gaseous hydrogen from the hydrogen cylinder 52. Gaseous hydrogen circulated in the hydrogen circulating passage 54 can be led into a dilution box (a storage box) 56 via a purging valve 55.

In the meantime, air as oxidizer gas is supplied to the fuel cell 51 in a state that is pressurized by a predetermined pressure after it is directed into a supercharger 58 via an air cleaner 57 and is directed into the dilution box 56 after it is used for power generation. An inter-cooler 58a is provided for cooling air (oxidizer gas) supplied to the fuel cell 51. A humidifier 59 is provided for supplying moisture to the oxidizer gas. A bypass valve 58b is provided for supplying air without passing the inter-cooler 58a and the humidifier 59 when the fuel cell 51 is at low temperature. A back pressure valve 58c is provided for adjusting the pressure of oxidizer gas in the fuel cell 51.

When the purging valve 55 that is provided for the hydrogen circulating passage 54 is opened, gaseous hydrogen after reaction is led into the dilution box 56. After gaseous hydrogen that is stored in the dilution box 56 is mixed with air emitted from the fuel cell 51 and similarly stored in the dilution box 56 and is diluted, it is emitted into the air via a muffler 61.

Water generated in the fuel cell 51 is extracted when it is led into the humidifier 59 together with emitted air and is reutilized for moisture supplied to the oxidizer gas. Moisture (for example, water vapor) not extracted into the humidifier 59 is exhausted together with reacted gas via the dilution box 56 or is exhausted via a drainage pipe 81 after the moisture is condensed in the dilution box 56. A control valve 82 for opening or closing its channel at a predetermined time (for example, every predetermined time) is provided for the drainage pipe 81.

The operation of the fuel cell 51 is controlled by an electronic control unit (ECU) 62. More specifically, a signal related to the pressure and the temperature of the gaseous hydrogen and oxidizer gas, a signal related to vehicle speed and the number of revolutions of the supercharger 58 and a signal related to the fuel cell 51 and the temperature of its cooling water are input to ECU 62. The operation of the supercharger 58, the bypass valve 58b, the back pressure valve 58c, the purging valve 55 and the cut-off valve 53 is controlled according to each of these signals.

In addition, an acceleration request signal from the throttle grip 15 is input to the ECU 62 and the drive of the motor 31 for driving the rear wheel 32 is controlled according to the signal. The motor 31 is a three-phase motor driven when direct current from the fuel cell 51 or a battery 63 as a secondary battery is supplied after the direct current is converted to a three-phase alternating current in a motor driver 64 as an inverter unit.

For a cooling system in the fuel cell system, a cooling channel 66 is provided for communicating each channel in a water jacket of the fuel cell 51 and the motor 31, and for communicating each channel in the inter-cooler 58a and in a cooling plate (a cooler) 65 adjacent to the motor driver 64. A water pump 67 and a radiator 68 are provided for the cooling channel 66.

In such a cooling system, as cooling water is circulated in the cooling channel 66 by the operation of the water pump 67, heat is absorbed from the fuel cell 51, the motor 31, oxidizer gas and the motor driver 64 and the heat is radiated by the radiator 68. A thermostat 69 is provided for circulating cooling water without passing the radiator 68 when the fuel cell 51 is at a low temperature.

To explain referring to FIGS. 1 to 3, the hydrogen cylinder 52 is a general high-pressure gas cylinder having a cylindrical appearance and is a general compound reservoir made of metal and fiber reinforced plastics. Such a hydrogen cylinder 52 is arranged above the rear wheel 32 and on the right side of the rear of the body so that the axis (the center line) C is longitudinal. In more detail, the axis C is inclined slightly downwardly in the forward direction The hydrogen cylinder 52 at this time is arranged so that the right side end (the outside end) is located slightly outside the outside end of the upper tube 6 on the right side of the body and the left side end (the inside end) is located slightly outside the outside end of the rear wheel 32.

The front and rear ends of the hydrogen cylinder 52 are formed spherically (in other words, in a tapered state) and the hydrogen cylinder is arranged so that the front end is located in front of the pivot plate 8 and the rear end is located at the rear end of the body. A main tap 71 of the hydrogen cylinder 52 and a hydrogen filling port 72 are arranged at the rear end of the hydrogen cylinder 52.

The upper tube 6 on the left side of the body is inclined rearwardly and slightly upwardly and extends substantially linearly rearwardly, while the upper tube 6 on the right side of the body extends gently downwardly in the vicinity of the pivot plate 8, compared with the upper tube 6 on the left side of the body. Each such upper tube 6 is gently directed outside in a direction of the width of the body in the vicinity of the pivot plate 8.

In addition, the upper tube 6 on the right side of the body is provided so that the lower end is substantially overlapped with the lower end of the hydrogen cylinder 52 when the body is viewed from the side and is bent upwardly at the rear end of the body and is bent downwardly after the upper tube extends towards the left side of the body to avoid the main tap 71 of the hydrogen cylinder 52 and the hydrogen filling port 72, and is coupled to the rear end of the upper tube 6 on the left side of the body.

The fuel cell 51 is wide in the direction of the width of the body and is vertically flat. A supply port and an exhaust port for the oxidizer gas and gaseous hydrogen and an inlet and an outlet for cooling water are provided on the front wall.

Figure 6:
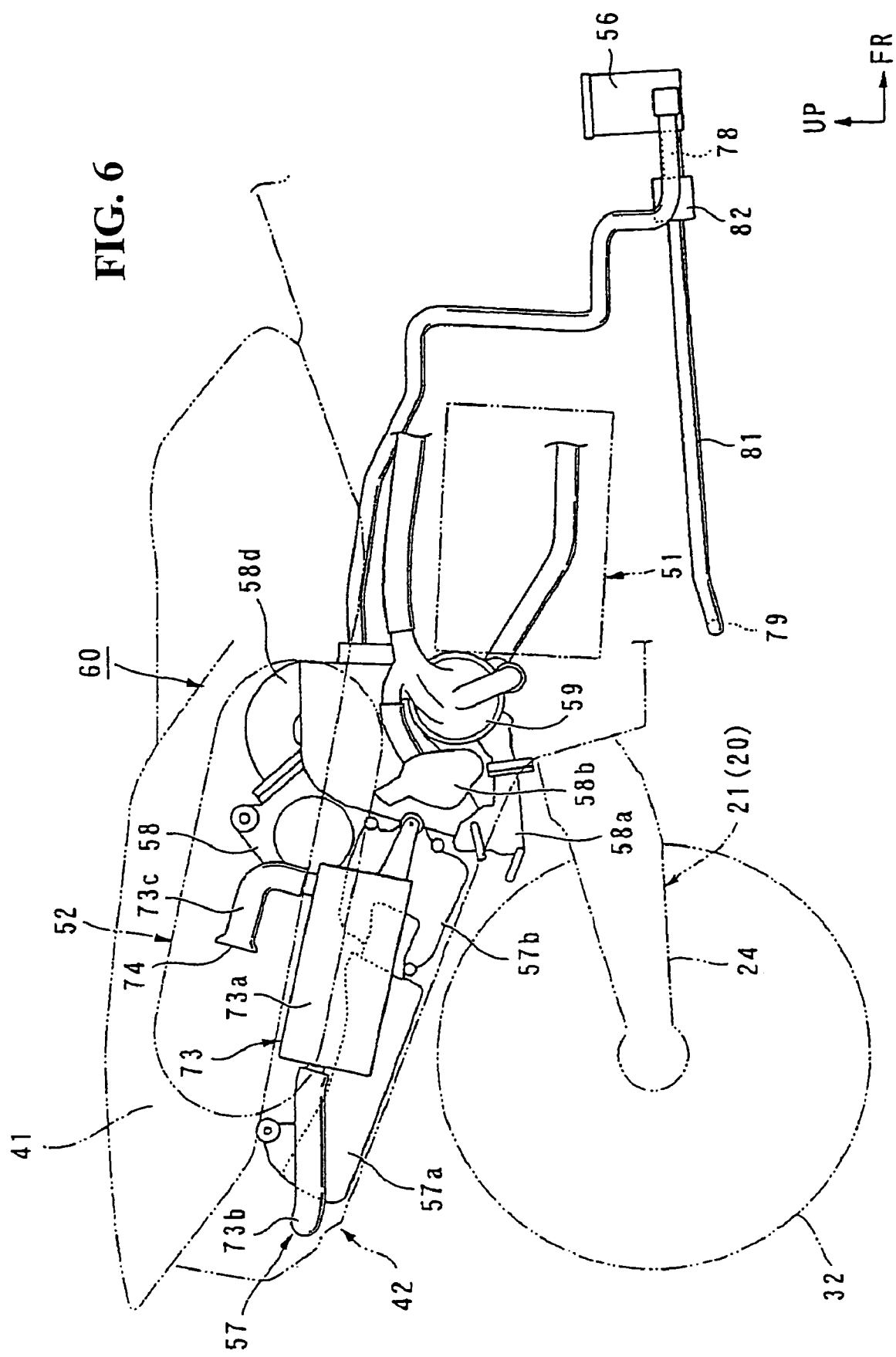
FIG. 6 is a right side view showing intake/exhaust members in the fuel cell electric vehicle.
Figure 7:
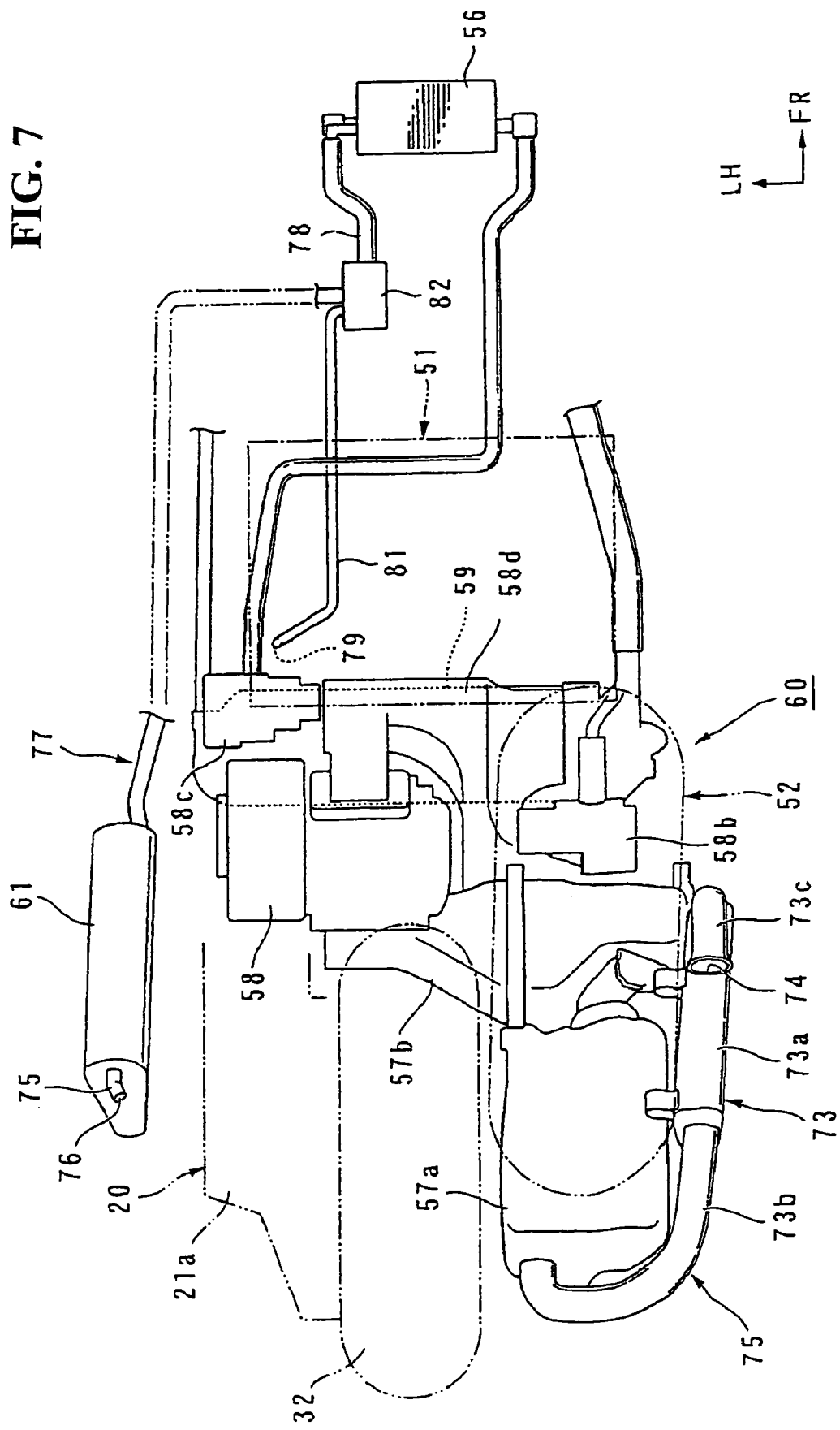
FIG. 7 is a top view showing the intake/exhaust members.

To explain referring to FIGS. 6 and 7, the humidifier 59 having a body that is long in the direction of the width of the body is arranged closely on the upside and at the back of the fuel cell 51. The supercharger 58 is arranged closely on the diagonally upside and at the back of the left side of the humidifier 59. The left side of an introduction duct 57b extends in the direction of the width of the body and is connected to the diagonally lower rear of the supercharger 58. The back pressure valve 58c is arranged closely over the left side of the humidifier 59.

The introduction duct 57b is provided so that the right side is located under the hydrogen cylinder 52 and the front end of an air cleaner case 57a located similarly under the hydrogen cylinder 52 is connected to the right side. An intake duct 73 is connected to the rear end of the air cleaner case 57a and the air cleaner 57 is configured mainly by the intake duct 73, the air cleaner case 57a and the introduction duct 57b.

The intake duct 73 is arranged closely on the right side of the air cleaner case 57a and the introduction duct 57b and extends longitudinally there along. The intake duct 73 is provided with the body 73a of the duct as a chamber flat in the direction of the width of the body with a connecting tube 73b bent after the connecting tube extends rearwardly from the rear end of the body 73a of the duct and is connected to the rear end of the air cleaner case 57a. An intake nozzle 73c is bent rearwardly after the intake nozzle extends upwardly from the front side of the upper end of the body 73a of the duct, and the intake nozzle 73c forms a funnel-shaped intake port 74 open toward the back in a position on the upside of the rear wheel 32. The intake port 74 is surrounded by the seat 41 and the body cover 42 and the invasion of foreign matter such as water, mud and dust is inhibited.

The bypass valve 58b is arranged closely at the back of the right side of the humidifier 59 and the inter-cooler 58a is arranged closely at the diagonally lower back of the bypass valve 58b. The bypass valve 58b and the inter-cooler 58a are arranged so that they are located between the right side of the humidifier 59 and the right side of the introduction duct 57b in a longitudinal direction of the body. One end of a lead-through duct 58d is connected to a squirt hole located in the diagonally upper front of the supercharger 58 and the other end of the lead-through duct 58d extends rightwardly and is bent to avoid the front end of the hydrogen cylinder 52 and is connected to an inlet of the inter-cooler 58a.

The muffler 61 is substantially flat in the direction of the width of the body and is arranged on the left side of the rear of the body so that the muffler is located outside the upper tube 6 on the left side of the body in the direction of the width of the body. The muffler 61 is substantially rectangular when it is viewed from the side of the body and is arranged in a state inclined so that the rear is located higher on the diagonally upper left side of the rear wheel 32. The muffler 61 is provided on a rear half of an exhaust pipe 77 and inclined so that the rear is located higher. A tail pipe 75 projects rearwardly from the rear end of the muffler 61 (the exhaust pipe 77. An exhaust port 76 of reacted gas is formed at the rear end of the tail pipe 75.

The muffler 61 (the exhaust pipe 77) is arranged on the left side of the rear wheel 32, while the air cleaner 57 is arranged on the right side of the rear wheel 32. The muffler 61 and the air cleaner 57 are both arranged at the back of the fuel cell 51. The muffler 61 and the air cleaner 57, arranged on the left and on the right with the rear wheel 32 between them in the rear of the body as described above, separate the exhaust port 76 and the intake port 74 by a predetermined amount and locate the intake port 74 on the upside by a predetermined amount of the rear wheel 32.

Intake members including the air cleaner 57, the supercharger 58, the bypass valve 58b, the inter-cooler 58a and the humidifier 59 and exhaust members including the back pressure valve 58c and the muffler 61 (the exhaust pipe 77) are mutually arranged to be close at the back of the fuel cell 51. More specifically, in the rear of the body. An intake/exhaust module 60 is formed by integrating each intake member and each exhaust member via a coupling stay not shown.

The radiator 68 is divided into a relatively small upper radiator 68a located in front of the head pipe 5 and a relatively large lower radiator 68b located in front of the front side 7a of each down tube 7. The water pump 67 is arranged at the back of the right side of the lower radiator 68b and the thermostat 69 is arranged at the back of the diagonally downside of the water pump 67. The battery 63, that is flat in the direction of the width of the body, is arranged inside each body cover 42 located on both sides of the lower radiator 68b.

The dilution box 56 is arranged between the bent parts 7c of each down tube 7 so that the dilution box projects downwardly from the lower end of the lower side 7b. An exhaust short pipe 78 is led out of the dilution box 56, is connected to the front side of the lower side 7b of the down tube 7 on the left side of the body, and the exhaust pipe 77 is led from the rear side of the lower side 7b. More specifically, the down tube 7 on the left side of the body forms a part of an exhaust path of reacted gas. Therefore, gas exhausted from the dilution box 56 is exhausted into the air via the exhaust short pipe 78, the lower side 7b of the down tube 7 and the exhaust pipe 77.

The drainage pipe 81 is branched from an intermediate part of the exhaust short pipe 78 via the control valve 82 and extends rearwardly along the lower side 7b of the down tube 7 on the left side of the body. The control valve 82 is normally closed and the control valve 82 closes a waterway of the drainage pipe 81 to permit only the flow of exhaust gas. When the control valve is opened only for a fixed time at predetermined time exhaust gas flow can exhaust water stored in the dilution box 56 outside the body via the drainage pipe 81.

Figure 5:
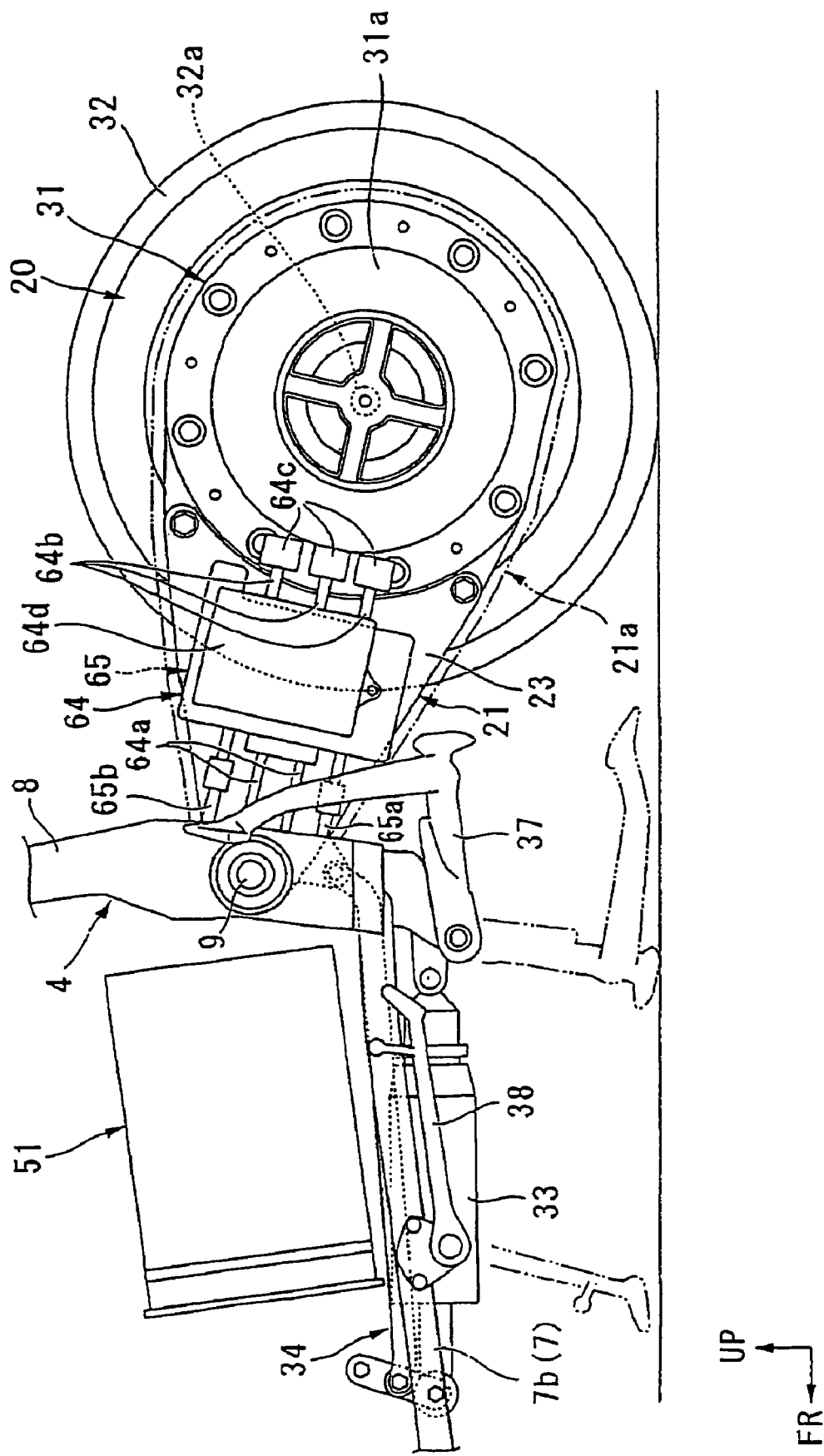
FIG. 5 is an enlarged view showing a main part in FIG. 1.

To explain also referring to FIG. 5, the motor driver 64 is substantially rectangular when the body is viewed from the side and is attached to the outside in the direction of the width of the body of the left arm body 23 of the rear swing arm 21 via the cooling plate 65. High-voltage wiring 64a for supplying electric power from the fuel cell 51 and the battery 63 is connected to the front end of the motor driver 64. A feed pipe 65a and a drainage pipe 65b which are a part of the cooling channel 66 are connected to a lower part and an upper part of the front end of the cooling plate 65.

Three-phase high-voltage wirings 64b are directed out from the rear end of the motor driver 64 and each-phase high-voltage wiring 64b is connected to a feeding terminal at the front end of the motor 31 located immediately at the back of the motor driver 64. More specifically, the motor driver 64 is arranged close to the motor 31 to an extent that the motor driver is not overlapped with the motor when the body is viewed from the side. A current sensor 64c is provided to each-phase high-voltage wiring 64b for detecting an amount of current fed to the motor 31. A voltage smoothing capacitor 64d is provided as a part of the motor driver 64.

An arm cover 21a, as a part of the rear swing arm 21, is mounted on the motor unit 20. The arm cover 21a covers and suitably protects the motor driver 64, the cooling plate 65, the voltage smoothing capacitor 64d, each high-voltage wiring 64a, 64b, the feed pipe 65a, the drainage pipe 65b and the current sensor 64c together with the rear swing arm 21 and the motor 31. A fresh-air inlet and a fresh-air outlet, not shown, are provided on the arm cover 21a so that outside air can be circulated inside the arm cover 21a.

Figure 8:
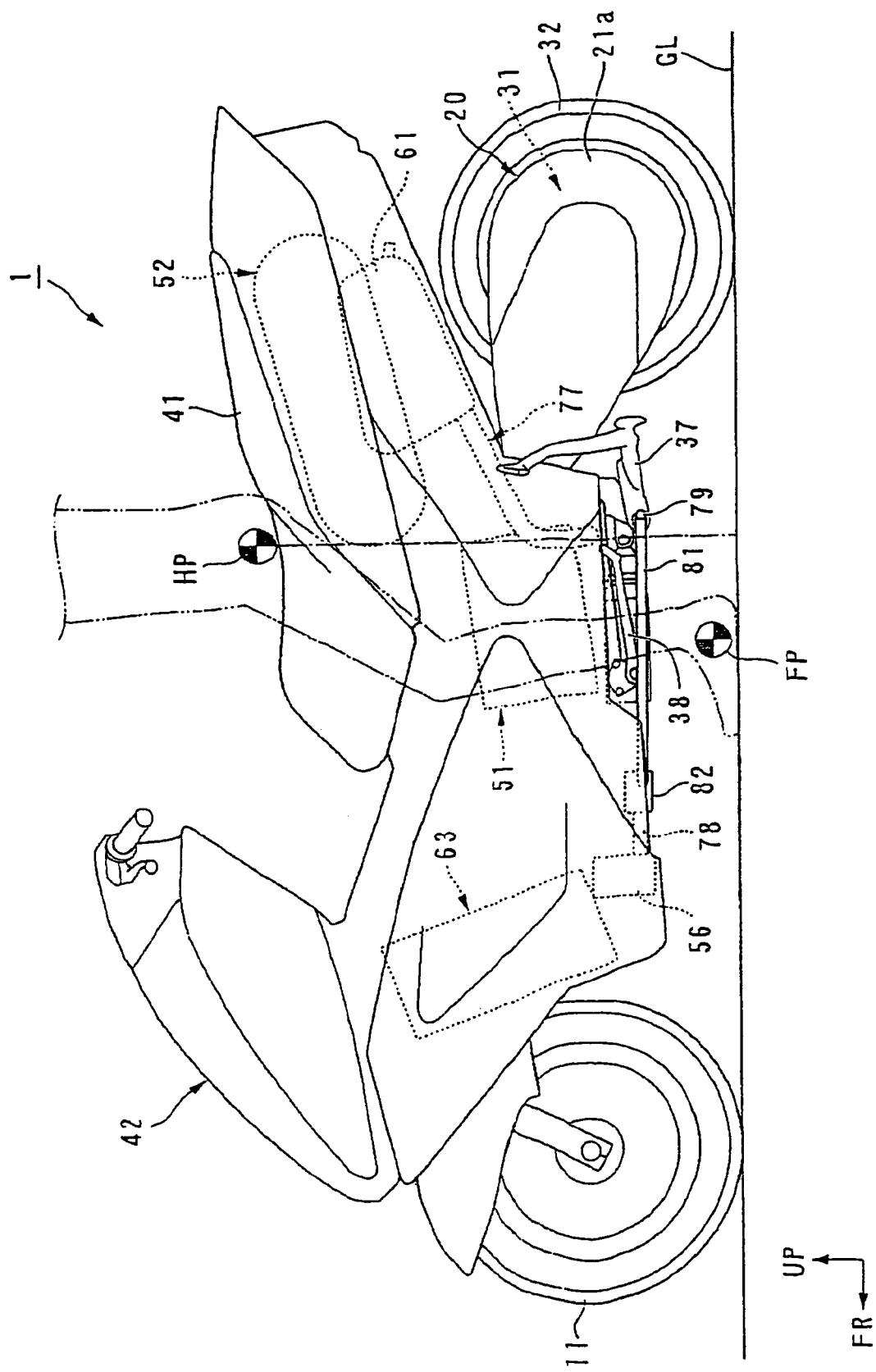
FIG. 8 is a left side view showing a state in which a rider rides on the fuel cell electric vehicle.
Figure 9:
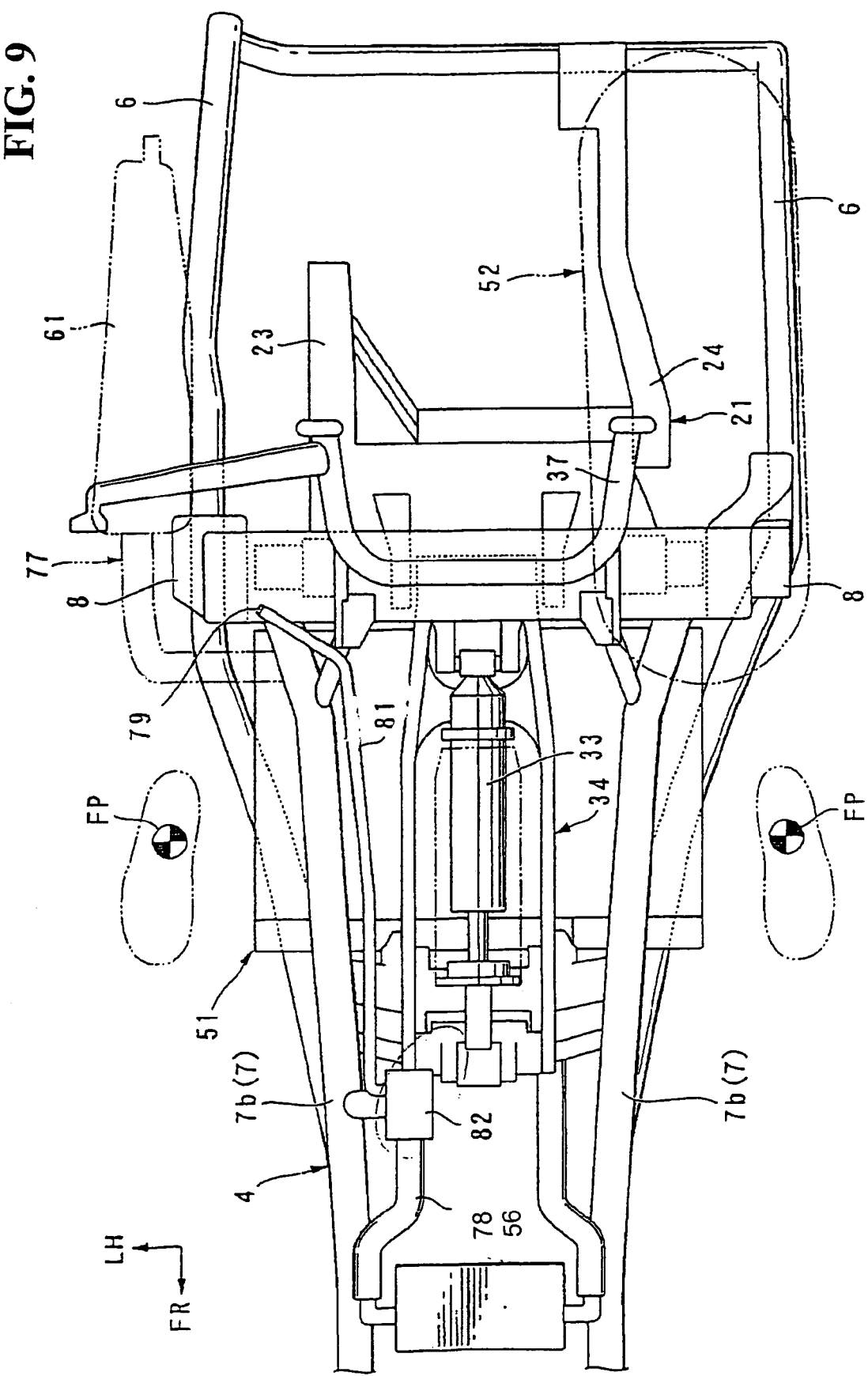
FIG. 9 is an enlarged view showing a main part in FIG. 3.

As shown in FIGS. 8 and 9, the drainage pipe 81 is bent toward the diagonally rear left side in a position in which the rear is substantially overlapped in the longitudinal direction with a rider's seated reference position (hereinafter merely called a seated position) HP on the seat 41. The bending of the drainage pipe 81 locates the scupper 79, which is an opening at its rear end, to be at the back of the seated position and on the left side of the body, that is, on the side of the side stand 38. The scupper 79 opens toward the diagonally rear left side.

A code FP denotes a reference position (hereinafter merely called the position of a foot) when the rider seated on the seat 41 puts his/her foot on the ground (shown by a line GL) while the vehicle is stopped and the position of the foot FP is located in front of the seated position HP, that is, in front of the scupper 79.

Figure 10:
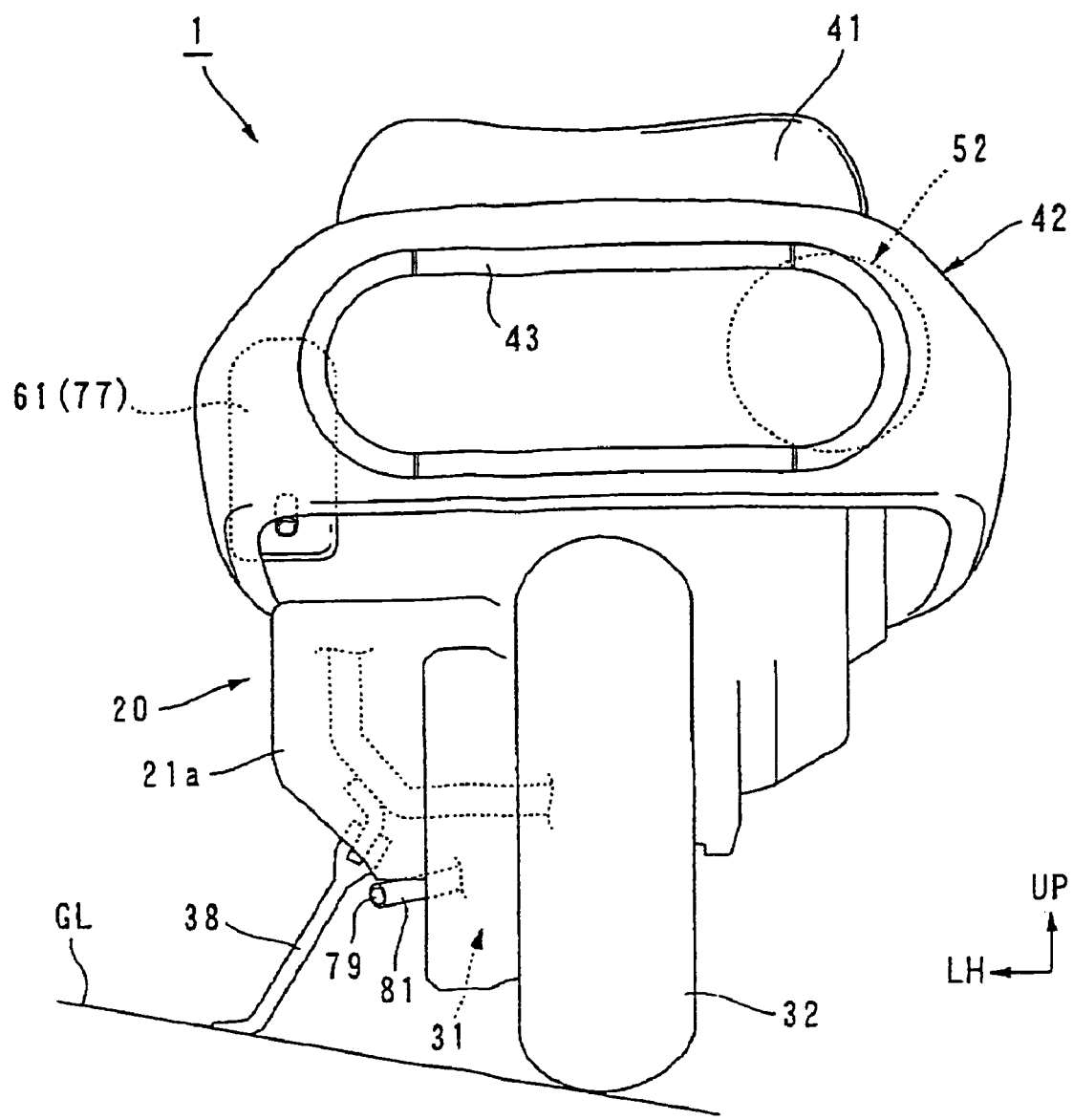
FIG. 10 is a back view showing the fuel cell electric vehicle.

Further, as shown in FIG. 10, when the motorcycle 1 is supported by the side stand 38 in a state in which the body is inclined on the left side, the scupper 79 is open towards the diagonally left downside. Thus, water in the drainage pipe 81 is easily exhausted, and the invasion of rainwater and other matter into the drainage pipe is prevented. A substantially elliptic tail lamp 43 is provided without an end when the body is viewed from the rear.

As described above, the drainage structure of the fuel cell electric vehicle (the motorcycle 1) in the embodiment is provided with the fuel cell 51 for generating electric power by reacting hydrogen and oxygen. The hydrogen cylinder 52 is provided for supplying gaseous hydrogen to the fuel cell 51 with the dilution box 56 being provided for storing gas exhausted from the fuel cell 51 and generated water. The drainage pipe 81 is provided for draining water in the dilution box 56 with the scupper 79 being connected to the drainage pipe 81 and open towards the side of the body. The control valve 82 is opened or closed at predetermined times and is arranged for controlling drainage from the drainage pipe 81.

According to this configuration, the exhaust pipe 77, that is provided with the muffler 61, is directed out of the dilution box 56 separately from the drainage pipe 81 wherein emission gas in the dilution box 56 is exhausted into the air using the exhaust pipe 77. Thus, only water that is generated in the system and supplied to the dilution box 56 can be exhausted using the drainage pipe 81 at a predetermined time. That is, gas exhausted from the fuel cell 51 can be exhausted into the air via the muffler 61 and generated water from the fuel cell 51 can be moderately exhausted.

At this time, as generated water led by the drainage pipe 81 is exhausted toward the side of the body from the scupper 79, it can be reduced that the generated water is splashed on the rear wheel 32 which is a driving wheel.

In the above-mentioned drainage structure, as the scupper 79 is located at the back of the seated position HP of the motorcycle 1 which is a saddle-ride type vehicle, drainage is made at the back of the position of a foot FP located in front of the seated position HP and it can be reduced that exhausted generated water may be splashed on the rider's foot.

Further, in the drainage structure, as the scupper 79 is arranged on the side (the left side of the body) on which the side stand 38 is provided, generated water in the drainage pipe 81 is also easily exhausted from the scupper 79 when the body is supported in an inclined state by the side stand 38 while the vehicle is stopped. That is, drainability when the vehicle is stopped can be enhanced.

The configuration in the above-mentioned embodiment is an example, it is natural that the configuration is not limited to application to a motorcycle, and it need scarcely be said that various modifications are allowed in a range which does not deviate from the objects of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A drainage structure in a fuel cell electric vehicle comprising:
    a fuel cell for generating electric power by reacting hydrogen and oxygen,
    a hydrogen cylinder for supplying gaseous hydrogen to the fuel cell,
    a storage box for storing gas emitted from the fuel cell and generated water,
    a drainage pipe for leading water from the storage box, and
    a scupper provided on the drainage pipe and open toward the side of the vehicle, comprising:
    a control valve for opening or closing at predetermined times, said control valve being arranged for controlling drainage from the drainage pipe,
    wherein the control valve is disposed forwardly of the fuel cell, and the storage box is disposed forwardly of the control valve
    wherein the drainage pipe for leading water from the storage box extends from the control valve and continues rearwardly beneath the fuel cell in a direction that is substantially parallel to a length of the vehicle.

2. The drainage structure in a fuel cell electric vehicle according to claim 1, wherein the scupper is located at the back of a position of a seat of the vehicle.

3. The drainage structure in a fuel cell electric vehicle according to claim 2, and further including a side stand for supporting the vehicle in a state inclined on one side, and wherein the scupper is arranged on the side on which the side stand is provided.

4. The drainage structure in a fuel cell electric vehicle according to claim 1, and further including a side stand for supporting the vehicle in a state inclined on one side, and wherein the scupper is arranged on the side on which the side stand is provided.

5. The drainage structure in a fuel cell electric vehicle according to claim 4, wherein positioning the scupper on the side on which the side stand is provided permits a discharge of water from the storage box by gravity when the side stand is extended for supporting the vehicle and the control valve is opened.

6. The drainage structure in a fuel cell electric vehicle according to claim 1, wherein the storage box is a dilution box operatively connected to an exhaust pipe of said vehicle for permitting the exhaust gas to normally pass through said control valve to a muffler operatively connected to said control valve.

7. The drainage structure in a fuel cell electric vehicle according to claim 6, wherein opening said control valve at a predetermined time permits said exhaust gas to flow through the dilution box and through said control valve to assist in the discharge of water from the dilution box.

8. The drainage structure in a fuel cell electric vehicle according to claim 1, wherein the drainage pipe extends under the fuel cell in a direction that is substantially parallel to a length of the vehicle.

9. A drainage structure in a fuel cell electric vehicle comprising:
    a fuel cell for generating electric power by reacting hydrogen and oxygen;
    a hydrogen cylinder for supplying gaseous hydrogen to the fuel cell; a storage box for storing gas emitted from the fuel cell and generated water;
    a drainage pipe for directing water from the storage box and open toward the side of the vehicle; and
    a control valve operatively connected to said drainage pipe for being selectively opened or closed at predetermined times, said control valve being arranged for controlling drainage from the drainage pipe,
    wherein the drainage pipe for leading water from the storage box extends rearwardly from the control valve and continues rearwardly under the fuel cell in a direction that is substantially parallel to a length of the vehicle.

10. The drainage structure in a fuel cell electric vehicle according to claim 9, and further including a side stand for supporting the vehicle in a state inclined on one side, and wherein the drainage pipe is arranged on the side on which the side stand is provided.

11. The drainage structure in a fuel cell electric vehicle according to claim 10, wherein positioning the drainage pipe on the side on which the side stand is provided permits a discharge of water from the storage box by gravity when the side stand is extended for supporting the vehicle and the control valve is opened.

12. The drainage structure in a fuel cell electric vehicle according to claim 9, wherein the storage box is a dilution box operatively connected to an exhaust pipe of said vehicle for permitting the exhaust gas to normally pass through said control valve to a muffler operatively connected to said control valve.

13. The drainage structure in a fuel cell electric vehicle according to claim 12, wherein selectively opening said control valve at a predetermined time permits said exhaust gas to flow through the dilution box and through said control valve to assist in the discharge of water from the dilution box.

14. The drainage structure in a fuel cell electric vehicle according to claim 9, wherein the storage box is disposed in a position that is forward of and lower than the fuel cell.

15. A drainage structure adapted to be used with a fuel cell electric vehicle including a fuel cell for generating electric power by reacting hydrogen and oxygen, a hydrogen cylinder for supplying gaseous hydrogen to the fuel cell, a dilution box for receiving gas emitted from the fuel cell and for storing generated water comprising:
    a drainage pipe operatively connected to said dilution box for discharging water in the dilution box and open toward the side of the vehicle; and
    a control valve operatively connected to said drainage pipe for being selectively opened or closed at predetermined times, said control valve being arranged for controlling drainage from the drainage pipe,
    wherein the dilution box is disposed in a position that is forward of the control valve and forward and lower than the fuel cell, and
    wherein the drainage pipe for leading water from the dilution box extends rearwardly from the control valve, and then passes beneath the fuel cell in a lengthwise direction of the vehicle.

16. The drainage structure in a fuel cell electric vehicle according to claim 15, and further including a side stand for supporting the vehicle in a state inclined on one side, and wherein the drainage pipe is arranged on the side on which the side stand is provided.

17. The drainage structure in a fuel cell electric vehicle according to claim 16, wherein positioning the drainage pipe on the side on which the side stand is provided permits a discharge of water from the dilution box by gravity when the side stand is extended for supporting the vehicle and the control valve is opened.

18. The drainage structure in a fuel cell electric vehicle according to claim 15, wherein the dilution box is operatively connected to an exhaust pipe of said vehicle for permitting the exhaust gas to normally pass through said control valve to a muffler operatively connected to said control valve.

19. The drainage structure in a fuel cell electric vehicle according to claim 18, wherein selectively opening said control valve at a predetermined time permits said exhaust gas to flow through the dilution box and through said control valve to assist in the discharge of water from the dilution box.

20. The drainage structure in a fuel cell electric vehicle according to claim 15, wherein the control valve is disposed between the dilution box and the fuel cell.

* * * * *